United States Patent
Murray

(10) Patent No.: US 6,603,389 B1
(45) Date of Patent: Aug. 5, 2003

(54) METHOD FOR INDICATING A DELINQUENT RESPONSE TO A MESSAGE FROM A SELECTIVE CALL DEVICE

(75) Inventor: Bradley A. Murray, West Palm Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/419,929

(22) Filed: Oct. 18, 1999

(51) Int. Cl.⁷ .............................. G08B 5/22; H04Q 1/30
(52) U.S. Cl. .................. 340/7.2; 340/7.24; 340/7.21
(58) Field of Search ..................... 340/7.2, 7.24, 340/7.21

(56) References Cited

U.S. PATENT DOCUMENTS

| | | | | |
|---|---|---|---|---|
| 4,342,995 A | * | 8/1982 | Shima | 340/825.5 |
| 4,679,244 A | * | 7/1987 | Kawasaki et al. | 455/515 |
| 4,701,759 A | | 10/1987 | Nadir et al. | 340/7.62 |
| 4,868,560 A | * | 9/1989 | Oliwa et al. | 340/7.22 |
| 4,940,963 A | | 7/1990 | Gutman et al. | 340/7.22 |
| 5,245,616 A | * | 9/1993 | Olson | 714/748 |
| 5,705,995 A | | 1/1998 | Laflin et al. | 340/7.48 |
| 5,920,576 A | | 7/1999 | Eaton et al. | 714/749 |
| 6,289,224 B1 | * | 9/2001 | Boxall et al. | 340/7.21 |

* cited by examiner

*Primary Examiner*—Donnie L. Crosland
(74) *Attorney, Agent, or Firm*—Keith A. Chamroo; Randi L. Dulaney; Daniel K. Nichols

(57) ABSTRACT

A two-way selective call device (106) for determining if a response was received to a message transmitted to a designation device including at least one switch (216) to construct the message having at least an identifiable character. An address book designates at least one destination device (106, 112, 116, 118) and a selector (216) selects a destination device (106) of the at least one destination device (106, 112, 116, 118) to receive the message. A transmitter (222) transmits the message to the destination device (106) and a timer (302) measures a first predetermined time. A processor (206) coupled to the receiver (204) monitors received messages during the first predetermined time period to determine when a response to the message was received and an output device (208, 212, 214) indicates when the response from the at least one identified destination device was not received within the first predetermined time period.

25 Claims, 3 Drawing Sheets

METHOD FOR INDICATING A DELINQUENT RESPONSE TO A MESSAGE FROM A SELECTIVE CALL DEVICE

FIELD OF THE INVENTION

This invention relates in general to communication systems, and more specifically to a method for indicating a delinquent response to a message from a selective call device.

BACKGROUND OF THE INVENTION

There are many types of communication systems in operation today (including two-way selective call systems) that provide message, data, and voice information. The communication subscriber units, e.g., two-way selective call devices or two-way subscriber devices, utilize sophisticated receiver/transmitter architectures and signaling formats that have been optimized to provide both high receiver sensitivities and excellent battery saving capabilities. With the proliferation of two-way selective call devices, users have become accustomed to and comfortable with using these two-way subscriber devices to transmit and request time critical information that can have, for example, enormous economical or other significant benefits to the users.

Currently, selective call devices have various types of alerts to indicate, e.g., the receipt of a message. Other types of alerts are: the "reminder alert" which is used to indicate to the user that a received message has not been read, the "content sensitive alert" which is used to provide an indication to the user that certain keywords were found within a received message, and the "message read alert" which is used to indicate to the sender of a message that a message was read.

When a user of a two way subscriber device sends a message soliciting a response, a question, or a request to another user, the user has to remember: 1) that a message containing a question was sent, 2) who was the recipient of the message containing the question, and 3) whether a response was received from that recipient. This task becomes even more burdensome when a user sends numerous questions or requests to multiple devices. Under this condition, the user could easily forget that a response was never received, and in this fast paced world where information is critical for economical or other critical needs, the user who forgets that a response is delinquent or was never received, may be unable to execute on critical time sensitive events that could be of great significance to the user.

Therefore, what is needed, in a two-way device or selective call device, is a method for alerting or reminding a user that an answer or a response is delinquent to a question or a message that was previously sent soliciting a response.

DESCRIPTION OF A PREFERRED EMBODIMENT

Figure 1:
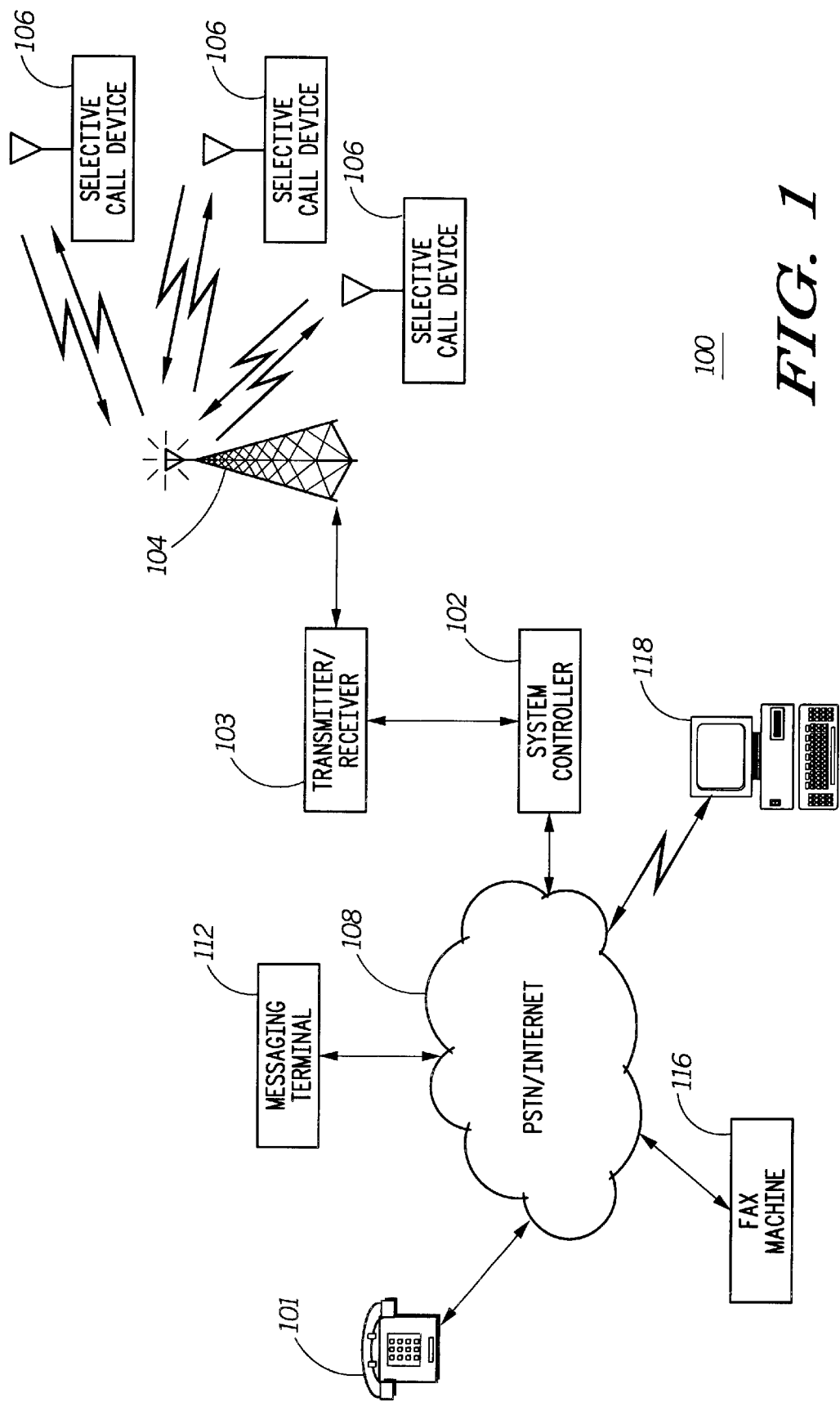
FIG. 1 is an electrical block diagram of a communication system in accordance with the preferred embodiment of the present invention.

Referring to FIG. 1, an electrical block diagram of a two-way selective call or radio communication system 100 is shown in accordance with the preferred embodiment of the present invention. The two-way selective call communication system 100 comprises a system controller 102 coupled or connected through a conventional public switched telephone network (PSTN) or internet 108 by conventional telephone links or other high data rate link suitable for such use. It can be appreciated that the communication system 100 can be coupled to other networks, e.g., satellites, microwaves or any other wireless or wireline communication system or protocol. Coupled to the PSTN/internet 108 are message-input devices, e.g., conventional telephone 101, a facsimile machine 116, a messaging terminal 112, and/or a computer 118 for sending and receiving electronic mail (email) or other electronic messages to, e.g., an email address. The communication system 100 preferably operates in accordance with the ReFLEX™ protocol, which is one of the FLEX® family of protocol standards. The system controller 102 oversees the operation of at least one radio frequency (RF) transmitter/receivers 103, through one or more communication links which, e.g., are twisted-pair telephone wires, which additionally can include RF, microwave, or other high quality audio communication links. The system controller 102 encodes and decodes inbound and outbound addresses into formats that are compatible with landline message switch computers. The system controller 102 also functions to encode and schedule outbound messages, which can include such information as analog voice messages, digital alphanumeric messages, graphics type data, and response commands, for transmission by the radio frequency (RF) transmitter/receivers 103 to a plurality of preferably two-way selective call devices 106 or two-way subscriber units 106. The system controller 102 further functions to decode inbound messages, including unsolicited and response messages received by the radio frequency transmitter/receivers 103 from the plurality of two-way selective call devices 106. It can be appreciated by one of ordinary skill in the art that selective call devices 106 are able to operate on multiple frequencies and multiple protocols.

An example of an outbound alphanumeric message intended for a selective call device 106 is an alphanumeric selective call message entered from the messaging terminal 112, a selective call device 106, computer 118, telephone 101 or FAX machine 116. An example of an outbound analog message intended for a selective call device 106 is a voice message entered from the telephone 101 or another selective call device 106. Examples of response messages are acknowledgments or demand response messages. An acknowledgment, e.g., is an inbound message transmitted by or from a selective call device 106 that can indicate a successful reception of an outbound message, an answer to a question, a response, or a request for information to the communication system. The inbound and outbound messages are included in outbound radio signals transmitted from, and inbound radio signals received by, respectively, a conventional antenna 104 coupled to the radio frequency transmitter/receiver 103.

It should be noted that the system controller 102 is capable of operating in a distributed transmission control environment that allows mixing conventional cellular, simulcast, satellite, or other coverage schemes involving a plurality of radio frequency transmitter/receivers, conventional antennas, for providing reliable radio signals within a geographic area as large as a worldwide network. Moreover, as one of ordinary skill in the art would recognize that the telephonic and selective call device communication system functions can reside in separate system controllers that operate either independently or in a network fashion. Each of the selective call devices 106 assigned for use in the radio communication system 100 has at least one address assigned to the communication system 100 which is a unique selective call address. The selective call address enables the transmission of a message to and from the system controller 102 only to the addressed selective call device 106.

Figure 2:
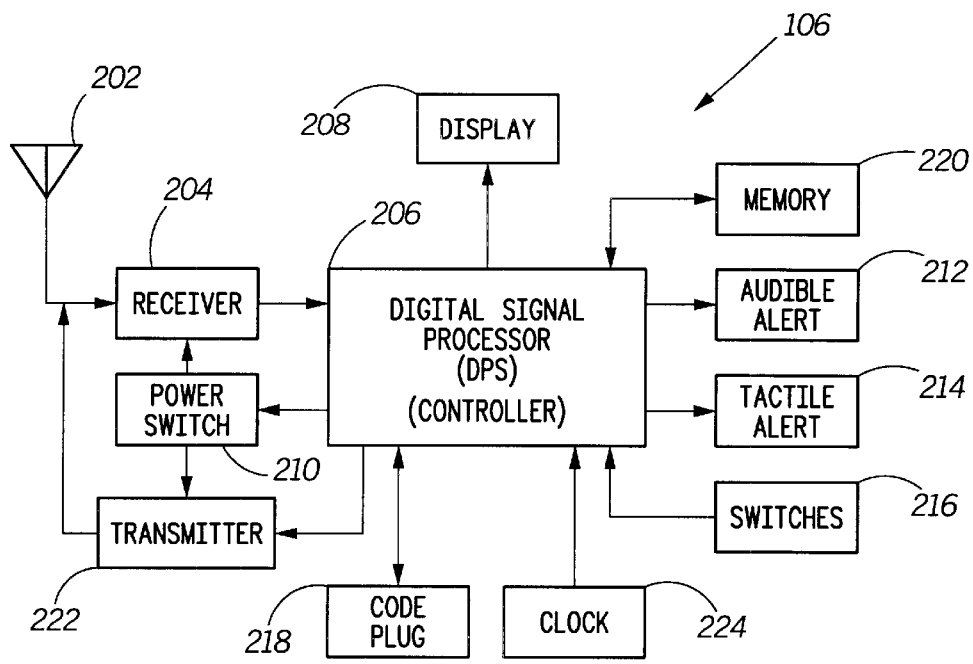
FIG. 2 is an electrical block diagram of a two-way selective call device according to the preferred embodiment of the present invention.

Referring to FIG. 2, an electrical block diagram of a selective call device is shown in accordance with the preferred embodiment of the present invention. It will be appreciated that the selective call device 106 is one of several types of radios or portable wireless devices, including two-way selective call devices, pagers, cellular radio telephones, conventional mobile radios, Personal Digital Assistants (PDAs) or conventional trunked mobile radios that have a data terminal attached thereto, or which optionally have data terminal capability for accessing the internet or intranet. Each of the selective call devices 106 assigned for use in the radio communication system 100 has an address assigned thereto which is unique to the selective call device 106. The address enables the transmission of a message from the system controller 102 to be received only by the addressed or designated selective call device 106, and identifies messages and responses received at the system controller 102 from the selective call device 106. Furthermore, each of one or more of the selective call devices 106 can have a unique telephone number assigned thereto, the telephone number being unique within the PSTN/internet 108 (FIG. 1). When the system controller 102 receives an inbound message from a selective call device 106, the system controller 102 establishes communication and checks by well known techniques if the requesting selective call device 106 is a valid subscribing unit within the communication system 100.

The selective call device 106 (e.g., a two-way selective call device) can initiate or transmit an inbound signal in response to the receipt of a message from the communication system 100 from, e.g., another selective call device. The outbound signal from, e.g., the system controller can be received on any signaling protocol, preferably the ReFLEX protocol. The selective call device 106 comprises an antenna 202 that provides a radio frequency (RF) carrier signal to a receiver 204. The receiver 204 generates a recovered signal suitable for processing by a digital signal processor ("DSP") or controller 206 in a manner well known to one of ordinary skill in the art. The DSP 206 performs functions such as encoding and decoding messages and controlling the operation of the selective call device 106 well known to one of ordinary skill in the art. The DSP 206 processes received signals to decode the address and compares the decoded address with one or more predetermined addresses contained in a memory, for example, a codeplug 218 or any other programmable read-only-memory (PROM). When the addresses are the same or substantially similar, the user is alerted that a signal has been received either by an audio alert (e.g., a speaker or transducer) 212, a tactile alert (e.g., a vibrator) 214, or an indication on a display 208. The received signal can also include optional message data directed to some selective call device 106. Also, if the selective call device 106 includes an optional voice output, recovered audio components of the received RF signal may be presented. For a message selective call device, the recovered message is stored in a memory 220 for subsequent presentation by an output device which for example is the display 208. The output device will automatically, or when manually selected by switches 216, present the message, such as by displaying the message on the display 208. The switches 216 also can be used a selector for designating a message as a message to which a response is requested. An external clock 224 can be optionally coupled to the digital signal processor 206 that provides clock signals to determine a count down period or predetermined time periods. In conjunction with the external clock 224, e.g., a predetermined value can be stored in a volatile or non-volatile memory, e.g., the memory 220 to perform timer functions. The controller 206 preferably decreases the count or predetermined value in memory. When that value reaches zero or some predetermined threshold, the user is alerted that the response or answer to his or her message or question is delinquent or has not been received, the details of which will be disclosed below.

According to the preferred embodiment of the present invention, a user of a selective call device 106 preferably the Motorola PagerWriter™ 2000 two-way selective call device can form, create, generate, or compose a message by using a keyboard (not shown), switches 216, or pre-stored messages in memory ("canned message"). The message is sent preferably to another selective call device 106 and includes a request for a response to the message or the message itself can be in the form of a question. It is preferred to include at least one special character within the message, preferably the question sign ("?") to enable a "no response" or "delinquent response" notification or alerting feature, the details will be discussed below. Preferably, the message is modulated by the DSP 206 and encoded in a manner well known in the art. The inbound message is then encoded by the DSP/controller 206 and passed to a transmitter 222 for transmission by the antenna 202. A power switch 210 performs battery saving functions well known to one of ordinary skill in the arts.

Figure 3:
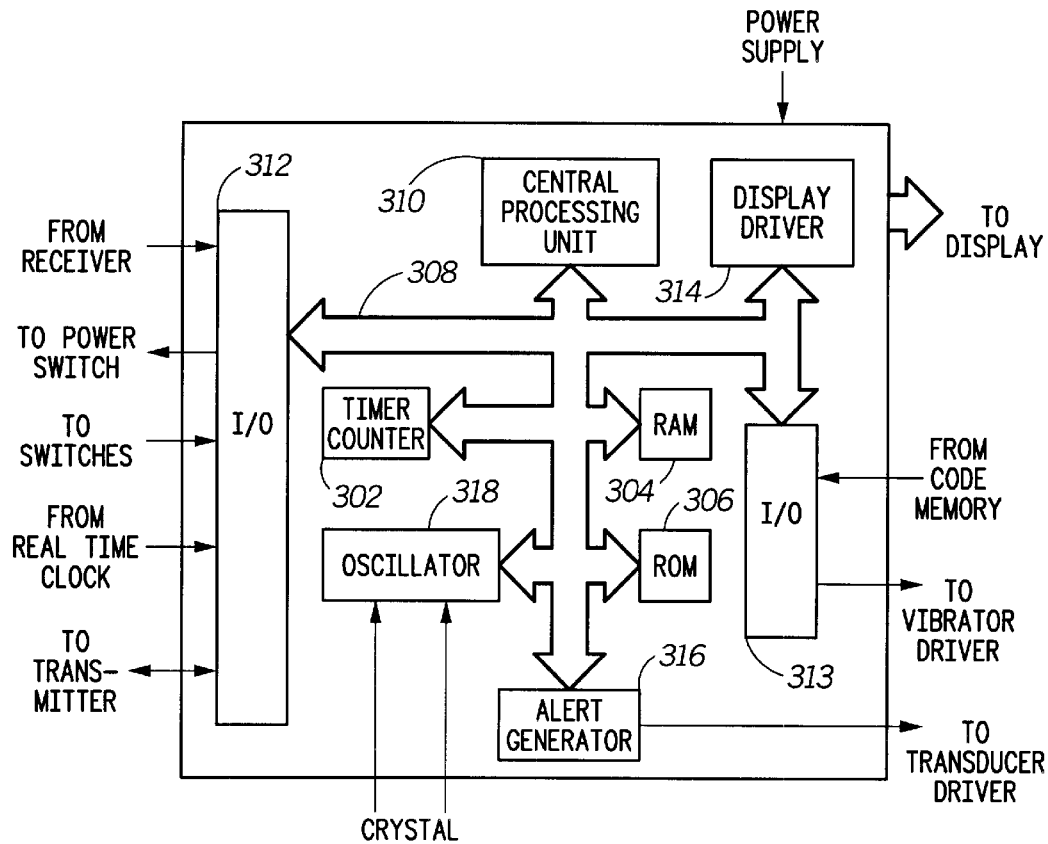
FIG. 3 an electrical block diagram of the DSP/controller according to FIG. 2.

The digital signal processor 206 of FIG. 2 can be implemented with a microcomputer or processor as shown in FIG. 3. FIG. 3 is an electrical block diagram of a microcomputer-based decoder/controller suitable for use in the selective call device 106 of FIG. 2. As shown, the microcomputer or DSP 206 preferably comprises a series microcomputers, such as manufactured by Motorola, Inc., which includes an on-board display driver 314. The microcomputer 206 includes an oscillator 318 that generates timing signals utilized in the operation of the microcomputer 206 and for varying the countdown or predetermined value to determine when an answer or response was not received or is delinquent. A crystal, or crystal oscillator (not shown) is coupled to the inputs of the oscillator 318 to provide a reference signal for establishing the microcomputer timing. A timer/counter 302 couples to the oscillator 318 and provides programmable timing functions that are utilized in controlling the operation of the receiver or the processor. The crystal, the oscillator 318, and timer/counter 302 are used to set the clock cycles to enable the DSP to, e.g., decrease the count value. A RAM (random access memory) 304 is utilized to store variables derived during processing, as well as to provide storage of message information or the timer values for setting the predetermined time for a response or an answer. A ROM (read only memory) 306 stores the subroutines that control the operation of the receiver or the processor. The oscillator 318, timer/counter 302, RAM 304, and ROM 306 are coupled through an address/data/control bus 308 to a central processing unit (CPU) 310 that performs the instructions and controls the operations of the microcomputer 206. According to the preferred embodiment of the present invention, the oscillator 318, the timer/counter 302, and RAM 304 which via the bus 308 coupled to the CPU 310 comprises one example of the hardware necessary for storing a predetermined value in RAM 304, and providing predetermined time for a response or answer. The CPU retrieves the predetermined value from RAM 304, and varies (e.g., decreases) it. When the predetermined value reaches zero or some predetermined value, the CPU 310 enables an alert to indicate that a response is delinquent or has not been received during the predetermined period of time. It is understood by one of ordinary skill in the art that instead of decreasing the count, the value could be increased.

The demodulated data generated by the selective call device 106 is coupled into the microcomputer 206 through an input/output (I/O) port 312. The demodulated data is processed by the CPU 310, and when the received address is the same as stored within the code-plug memory which couples into the microcomputer through, for example an I/O port 313, the message, if any, is received and stored in RAM 304. Recovery of the stored message and selection of the predetermined destination address are provided by the switches that are coupled to the I/O port 312. The microcomputer 206 then recovers the stored message and directs the information over the data bus 308 to the display driver 314 which processes the information and formats the information for presentation by a display 208 (FIG. 2) such as an LCD (liquid crystal display). At the time a selective call device's address is received, the alert signal is generated which can be routed through the data bus 308 to an alert generator 316 that generates the alert enable signal which is coupled to the audible alert device that was described above. Alternatively, when the vibrator alert is selected, as described above, the microcomputer 206 generates an alert enable signal which is coupled through data bus 308 to the I/O port 313 to enable generation of a vibratory, or silent alert. Switch inputs are received by the I/O port 312 via the data bus 308. The switch inputs are processed by the CPU 310. Specifically, the CPU 310 retrieves the address of the selective call base station from RAM 304 and in conjunction with the timer counter 302 and the oscillator 318, the CPU 310 generates the inbound signal which is passed via the data bus 308 to the transmitter.

The battery saver operation is controlled by the CPU 310 with battery saving signals which are directed over the data bus 308 to the I/O port 312 which couples to the power switch 210. Power is periodically supplied to the receiver to enable decoding of the received selective call device address signals and any message information, which are directed to the selective call device 106. Specifically, when the selective call device 106 begins decoding the selective call signal, the receiver is powered by the power switch 210. When the selective call information is received and stored, the microcomputer or DSP 206 sends a signal to the power switch 210 to disable power to the receiver 204 and enable power to the transmitter for transmitting the inbound signal.

Figure 4:
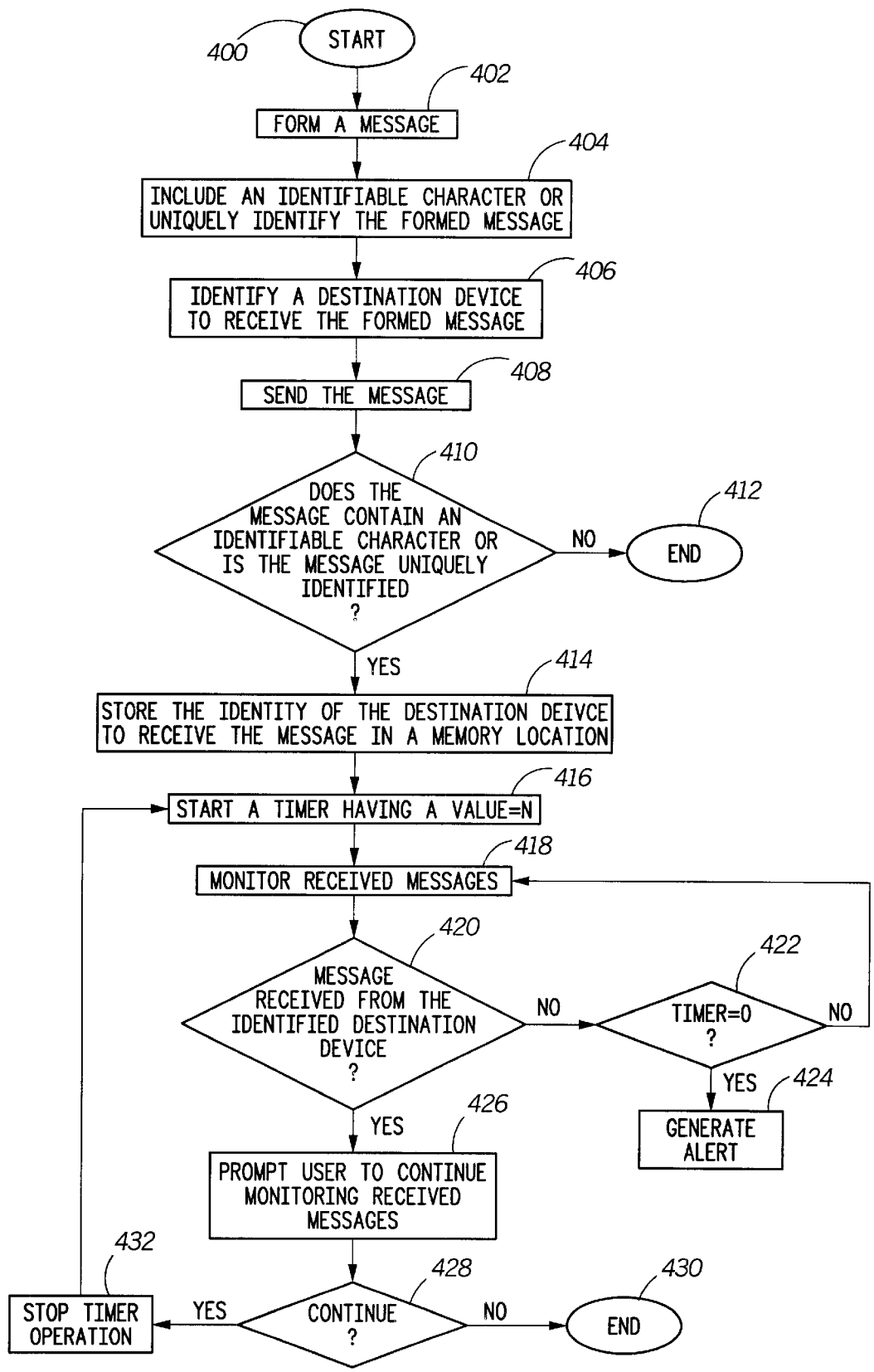
FIG. 4 is a flow diagram illustrating a method for indicating a delinquent response to a message in accordance with the preferred embodiment of the present invention.

Referring to FIG. 4, a flow diagram is shown illustrating a method for indicating a delinquent or no response to a message in accordance with the preferred embodiment of the present invention. The initialization process for start-up is performed, step 400. Preferably, the user of the selective call device 106 constructs, generates, forms, or writes a message in the form of a question or for soliciting a response, step 402. It is preferable for the message to include at least one identifiable or a special character to enable a "no response" or a "delinquent response" alert, step 404. The, preferred special character is the "?" character. The position of the special character, e.g., "?" in the message or question is not critical, but for grammatical purpose is best placed at the end of the message or question. It is appreciated that any character including numbers, letters, Greek alphabet, or icons can be used as the special character or as a receipt request icon. It is, however, desirable to make it convenient to the users to include or to remember the symbol for the special character. Alternately in step 404, the message can be uniquely identified without using the special character. This can be accomplished using well known techniques such as using switches 216 to select a mode in the selective call device 106 which enables the "no response" or "delinquent response" alert for messages constructed by the user.

In determining the addressee(s) of a message or question, the user preferably uses an address book application stored in the selective call device 106 well known to those skilled in the art to designate a destination or designated device, step 406. The designated or destination device could be the address of another selective call device 106, a computer 118 with an email account, a FAX machine 116 and any other addressable device, or all of or a combination thereof. The address book is scrolled through until the desired address is reached and selected. By selecting the desired address from the address book, the address is appended to, included, or associated with the message. It is appreciated that a designated recipient having the designated or destination device can have more than one address in the address book because the recipient can have, e.g., a pager, a cellular telephone, a fax machine, and a computer. The sender must therefore choose the desired address to send his/her message or question. Once the address is appended to the message, the message can be sent to the designated recipient, step 408. The DSP/controller 206 preferably under the operation of a software routine checks and determines if the special character, e.g., ("?") is present in the message to be transmitted or if the message is uniquely identified, step 410. It is appreciated that the message can be sent with or without the special character. If the message did not include the special character or was not uniquely identified, the process ends, step 412. On the other hand, if the special character is present or the message is uniquely identified, the user name and/or address of the recipient and all the related delivery addresses (e.g., pager, cellphone, facsimile, or email) that was previously stored in the address book are retrieved and stored in a special memory location, step 414.

After the message or question is transmitted and confirmed as being received by preferably the system controller 102, a timer in the selective call device is started to determine a predetermined time in which a response is to be received, step 416. This timer could be user settable and could be set to 10 minutes, for example. The DSP then begins to monitor any received messages to determine if and when a response or answer is received, step 418. The ReFLEX protocol allows for a selective call device 106 to determine whether a received message from another selective call device 106 is a reply to a message sent by the designated selective call device 106. This can be accomplished by identifying a reply message different from an unsolicited message. In this way, the selective call device 106 can determine if a received message is a reply or response to a message or question sent in step 408 or if a received message is an unsolicited message which may or may not be sent in response to a question or message sent in step 408. In step 420, the DSP checks if a message is received during the predetermined time period from the destination device identified in step 406 or alternatively from any one of the plurality of destination devices assigned to the recipient of the message as described previously. This allows the recipient of the message to respond with any one of the devices available for use (selective call device 106, computer 118, FAX machine 116, etc.) and not just the device that originally received the message or question. If not, the DSP 206 checks if the predetermined time has expired (timer=0), step 422. If not, the process continues to monitor received messages, step 418. Otherwise, if the timer is zero (the predetermined time has expired), the "no response" or delinquent response is generated to inform or alert the user that a response was not received or is delinquent, step 424. Returning to step 420, when a message is received during this time period and the identification of the sender's device (selective call device address, email account number, etc.) is the same or is from one of the addresses listed or stored in the special memory location (address, email account number, etc.) of the designated recipient, the user is prompted to determine if the selective call device 106 should continue to monitor the received messages (e.g., was the question was properly answered), step 426. At step 428, if the user indicates that the selective call device 106 should continue to monitor received message (an unsatisfactory or incomplete response), the current timer is reset, step 432, and a new time period is started, step 416. If, on the other hand, the question was appropriately answered, the user will indicate that the selective call device should stop monitoring the received message, step 428, and the process ends, step 430.

In this way, a "no response" or a "delinquent response" alerts the user that a response or answer was not received within a predetermined time period. The user may seek an alternative source or can extend time for a response or set a new time depending on the urgency or the user's request. The "no response" or "delinquent response" alerts the user to prevent the user from inadvertently failing to realized that a timely response was not received and to prevent a time critical event from passing without the user realizing.

Additionally, the preferred special character "?" can be used to select the value of the timer in step 416. For example, if the user constructs a message containing a single "?", the timer of step 416 could be set to 10 minutes, for example. However, if the user constructs a messages containing two special characters e.g. "??",the timer of step 416 could be set to 20 minutes (10 minutes per special character). This allows the user to selectively allow more response time for specific requests or questions.

In summary, in a two-way selective call device, a method for indicating a delinquent response includes the steps of generating a message having an identifiable character being addressed to a destination device; sending the message including the identifiable character to the destination device; setting a predetermined time for a response to the message including the identifiable character; monitoring received messages to determine when the response to the message including the identifiable character is received; and indicating that the response to the message including the identifiable character was not received within the predetermined time.

The step of indicating indicates when a response to the message including the identifiable character was received within the predetermined time, and the step of generating further comprises the steps of identifying a recipient of the message including the identifiable character; selecting an address from one or more addresses in an address book; and storing the one or more addresses of the recipient in a special memory. A user is prompted as whether to continue monitoring the received messages when the response is received on an address that is different from the address of destination device but is same as an address of the one or more addresses stored the special memory.

What is claimed is:

1. In a two-way selective call device, a method for indicating a delinquent recipient response to a user message, comprising the steps of:

generating a user message including an identifiable character being addressed to a destination device;

sending the user message to the destination device;

setting a predetermined time for a recipient response to the user message;

monitoring received messages to determine when the recipient response to the user message is received; and indicating that the recipient response to the user message was not received within the predetermined time.

2. The method according to claim 1 wherein the step of indicating comprises indicating when the recipient response to the user message was received within the predetermined time.

3. The method according to claim 1 wherein the step of generating further comprises the steps of:

identifying a recipient of the user message;

selecting one or more addresses of the recipient from one or more addresses in an address book; and storing the one or more addresses of the recipient in a special memory.

4. The method according to claim 3 further comprising the step of monitoring received messages to determine when a received message is received from any one of the one or more addresses of the recipient.

5. The method according to claim 4 further comprising the step of prompting a user whether to continue monitoring received messages when a received message is received on an address that is different from the address of the destination device but matches any one of the one or more addresses of the recipient.

6. The method according to claim 5 further comprising the steps of:

setting a second predetermined time period if the user elects to continue monitoring received messages; and monitoring received messages to determine whether a received message from any one of the one or more addresses of the recipient was received during the second predetermined time period.

7. The method according to claim 6 further comprising the step of indicating the recipient response to the user message was not received within the second predetermined time period.

8. The method according to claim 1 wherein the step of generating further comprises a step of including at least one "?" as the identifiable character.

9. The method according to claim 1 further comprising the step of sending the user message including the identifiable character to the destination device.

10. A two-way selective call device comprising:

at least one switch for constructing a user message including at least one identifiable character;

an address book for designating at least one destination device;

a selector for selecting a destination address of the at least one destination device to receive the user message;

a transmitter for transmitting the user message to the destination address;

a timer for measuring a first predetermined time;

a processor coupled to a receiver for monitoring received messages during the first predetermined time to determine if a recipient message is received; and an output device for indicating when the recipient message from the at least one destination device was not received within the first predetermined time.

11. The two-way selective call device according to claim 10 wherein:

the timer is started for a second predetermined time period if a user elects to continue monitoring received messages; and the processor determines whether the recipient message from the at least one destination device was received during the second predetermined time period.

12. The two-way selective call device of claim 11 wherein the output device indicates that the recipient message from the at least one destination device was not received within the second predetermined time period.

13. The two-way selective call device according to claim 12 wherein the destination device comprises any one of a portable wireless device, a computer having an electronic mail address and a facsimile machine.

14. The two-way selective call device according to claim 10 wherein the at least one identifiable character comprises at least one "?".

15. The two-way selective call device according to claim 10 wherein each one of a more than one "?" designates a predetermined time period for monitoring received messages.

16. In a portable wireless device, a method of determining when a recipient response to a user message is delinquent, comprising the steps of:

generating a user message;

identifying at least one destination device;

selecting the at least one destination device to receive the user message;

designating the user message as requiring a recipient response;

transmitting the user message to the at least one destination device;

setting a dine period during which the recipient response to the user message is to be received;

monitoring messages being received during the time period; and indicating when the recipient response to the user message was not received within the time period from the at least one destination device.

17. The method according to claim 16 wherein the step of indicating comprises indicating when the recipient response from the at least one destination device was received within the time period.

18. The method according to claim 16 further comprising the step of prompting a user whether to continue monitoring messages in response to a message being received from the at least one destination device within the time period.

19. The method according to claim 18 wherein the step of setting further comprises:

setting a second time period if a user elects to continue the step of monitoring messages; and determining whether the recipient response from the at least one destination device was received during the second time period.

20. The method according to claim 19 wherein the step of indicating comprises indicating when the recipient message from the at least one destination device was not received within the second time period.

21. The method according to claim 16 wherein the step of designating comprises selecting an icon designated as a receipt response icon.

22. The method according to claim 16 wherein the step of designating comprises including at least one "?" within the user message.

23. The method according to claim 16 wherein the step of designating comprises selecting a switch for indicating when the recipient response to the user message is received.

24. The method according to claim 16 wherein the step of identifying comprises identifying a recipient having more than one destination device to receive the user message.

25. The method according to claim 24 wherein the step of indicating indicates when the recipient response from the recipient was not received within the time period.

* * * * *

UNITED STATES PATENT AND TRADEMARK OFFICE
CERTIFICATE OF CORRECTION

PATENT NO. : 6,603,389 B1 Page 1 of 1
DATED : August 5, 2003
INVENTOR(S) : Murray, Bradley A.

It is certified that error appears in the above-identified patent and that said Letters Patent is hereby corrected as shown below:

<u>Column 10,</u>
Line 1, reads
"setting a dine period during which the recipient response"
should read
-- setting a time period during which the recipient response --

Signed and Sealed this

Second Day of December, 2003

JAMES E. ROGAN
*Director of the United States Patent and Trademark Office*